Patented Nov. 14, 1950

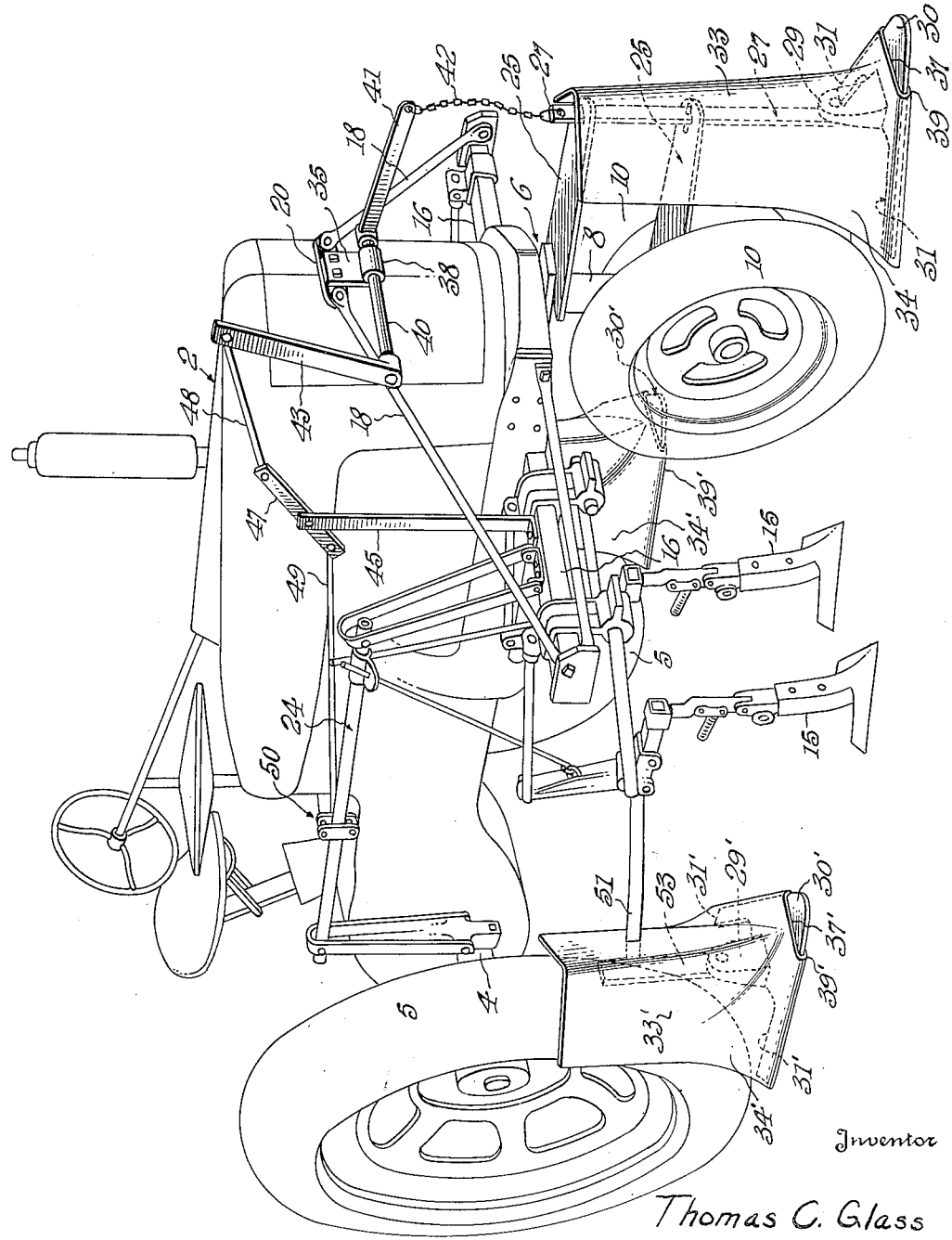

2,530,053

UNITED STATES PATENT OFFICE 2,530,053

TRACTOR WHEEL GUARD

Thomas Curtis Glass, La Grange, Ga.

Application October 29, 1948, Serial No. 57,320

4 Claims. (Cl. 97—192)

This invention relates to tractor attachments, and more particularly to attached fender devices for the wheels of tractors of the row-crop type.

When a tractor of the row-crop type is used for work on row-grown crops (as for example, when cultivating or spraying), it is run between matching rows, and its wheels will run over fallen or leaning stalks and long limbs of any plants which have grown out into the middle of the rows, thereby occasioning considerable damage to the anticipated crop.

It has heretofore been proposed to provide tractors of the row-crop type with attached fender devices for the purpose of turning aside fallen or leaning stalks, such as those of corn, cotton, etc., in order that they will not be run over by the wheels of the tractor but will, instead, be pushed aside and lifted into substantially vertical position.

All of the prior art devices of which I am aware are characterized either by mechanical deficiencies of one kind or another or by prohibitive cost of manufacture and/or application to the tractor.

It is among the objects of the present invention to provide an attached fender device for the wheels of a tractor of the row-crop type which is highly efficient in operation, although relatively simple and inexpensive to manufacture and install on tractors of existing design.

Another object is the provision of a device of the class described which is lowered and raised into and out of operative position by means of the power lift which forms part of the tractor's equipment.

The invention, then, comprises the features hereinafter fully described and as particularly pointed out in the claims, the following description and annexed drawings setting forth in detail an illustrative embodiment of the invention, this being indicative of but one of a number of ways in which the principles of the invention may be employed.

In said drawings:

The single figure is a perspective of a conventional tractor of the row-crop type which carries the usual cultivator and power lift, the attached fender device of the present invention being shown as applied to the rearward traction wheels and the smaller forwardly disposed dual steering wheels.

Referring more particularly to the drawings, wherein like numerals designate like parts in the several views, the novel attached fender device of the present invention is shown as attached to a conventional tractor 2 of the row-crop type, the said tractor comprising a rear axle having a wide tread, whereby it may span two plant rows, and a centrally disposed forward steering truck which travels in the space between the two rows spanned by the rearwardly disposed traction wheels. More specifically, the row-crop tractor 2 comprises a relatively narrow, longitudinally extending body portion, an elevated rear axle 4 carrying traction wheels 5, and a forward vertically disposed housing 6 in which there is journaled a downwardly depending steering shaft 8. A pair of relatively small steering wheels 10 are mounted on the lower end of the vertical steering shaft 8.

In addition to the foregoing, the tractor 2, being of a type which is in widespread use, comprises an attached cultivator, generally indicated at 15, the latter comprising a pair of outboard arms 16, one of which projects horizontally and transversely from each side of the forward end of the frame of the tractor, brace rods 18 extending diagonally upwardly from the outer ends of the said outward arms into bolted connection with a plate 20 which is secured to, or forms part of, the front end of the tractor. The cultivator 15, which is carried by the tractor 2, is lowered and raised into and out of operative position by means of a conventional power lift 24.

It will be understood by those skilled in the art that all of the foregoing construction and arrangement is old in the art, and as such, forms no part of the present invention.

The novel and improved attached fender device of the present invention comprises a pair of forwardly projecting horizontally extending superposed but spaced brackets 25 which are conveniently bolted to the vertically disposed housing or steering post 6 at the front of the tractor. Each of the brackets 25 is provided with a slot, the two slots being in vertical alignment and between them receiving a vertically slidable bar 27. To the lower end of the vertically slidable bar 27, there is secured a conventional sweep 29, the latter being provided with the usual triangular forwardly extending portion 30 with its rearwardly extending divergent arms 31.

The fender device for the forward steering wheels 10 comprises a vertically extending sheet-metal hood 33, the major body portion of which is V-shaped in plan with the lower portion thereof provided with an outwardly flared skirt, as shown. The lower end of the forward portion of the outwardly flared skirt of the sheet-metal hood 33 is cut away, as shown at 37, to enable the extension therefrom of the triangular forwardly extending portion 30 of the sweep 29. In addition, the bottom edges of the outwardly flared skirt are bent under the latter as indicated at 39. Suitable bolts (not shown) are employed for firmly securing the sheet-metal hood 33 to the vertically slidable bar 27.

A bracket 35 is bolted to the plate 20 (to which the upper and inner ends of the brace rods 18 are bolted) preferably by using the same bolts. This bracket 35 depends downwardly and carries at its lower end a horizontally extending tube 38 within which there is journaled a rotatable shaft 40 which projects therefrom at both ends. One end of the rotatable shaft 40 carries a right-angularly extending lever 41, the outer end of which is connected by a chain 42 to the upper end of the vertically slidable bar 27 which carries the sweep 29 and its attached sheet-metal hood 33, the connection providing for hinged movement in order that the vertically slidable bar 27 may properly move to one side or the other when the steering wheels 10 of the tractor are turned.

The other end of the horizontally disposed rotatable shaft 39 is extended and carries a vertical lever 43 on its outer end.

A vertical post 45 is attached to the outboard arm 16 which is on the same side of the tractor as the vertical lever 43, and on the upper end of this vertical post there is pivotally mounted a rocking lever 47 which extends longitudinally of the tractor. A rod 48 connects one end of the rocking lever 47 with the upper end of the vertical lever 43 on the extended end of the horizontally disposed rotatable shaft 40. The rearward end of the rocking lever 47 is connected by a rod 49 with a clamp 50 which is bolted to a forwardly-and-rearwardly moving element of the power lift 24.

Immediately in front of each of the rearward traction wheels 5 of the tractor, there is provided the usual horizontally extending arm 51, each of which supports a conventional cultivator sweep. More specifically, the outer end of each of the horizontally extending arms 51 carries the usual depending plow-foot 53 to the lower end of which there is secured a conventional cultivator sweep, the latter in this case being designated 29'. In accordance with the teachings of the present invention, the sweep 29' on either side of the tractor is provided with a sheet-metal hood 33' and associated instrumentalities in the manner earlier described in connection with the front sweep 29.

According to the foregoing construction and arrangement, the three sweeps and their associated sheet-metal hoods are moved downwardly and upwardly into and out of operative position upon the corresponding movement of the cultivator 15 by the power lift 24.

As before stated, the structure described exemplifies a preferred form of the invention, variations therefrom being contemplated within the scope of the following claims.

I claim:

1. A stalk lifting attachment for tractors of the row-crop type comprising a vertically disposed bar carrying a horizontally disposed and substantially V-shaped sweep at its lower end, a vertically disposed sheet-metal hood having an outwardly flared skirt at its lower end, the bottom edge of the outwardly flared skirt of said vertically disposed sheet-metal hood being bent under the bottom edge of said horizontally disposed and substantially V-shaped sweep, and means for raising and lowering said vertically disposed bar.

2. A stalk lifting attachment for tractors of the row-crop type and possessed of a power lift comprising a vertically disposed bar carrying a horizontally disposed and substantially V-shaped sweep at its lower end, a vertically disposed sheet-metal hood having an outwardly flared skirt at its lower end, the bottom edge of the outwardly flared skirt of said vertically disposed sheet-metal hood being bent under the bottom edge of said horizontally disposed and substantially V-shaped sweep, and means for connecting said vertically disposed bar with the power lift of said tractor.

3. A stalk lifting attachment for tractors of the row-crop type and possessed of a cultivator and power lift for lowering and raising the same respectively into and out of operative position, said stalk lifting attachment comprising a vertically disposed bar carrying a horizontally disposed and substantially V-shaped sweep at its lower end, a vertically disposed sheet-metal hood having an outwardly flared skirt at its lower end, the bottom edge of the outwardly flared skirt of said vertically disposed sheet-metal hood being bent under the bottom edge of said horizontally disposed and substantially V-shaped sweep, and means for connecting said vertically disposed bar with the power lift of said tractor.

4. A stalk lifting attachment for tractors of the row-crop type comprising a sheet-metal hood adapted for vertical disposition and having an outwardly flared skirt at its lower end, the bottom edge of said outwardly flared skirt being bent under, whereby said hood may be mounted over a horizontally disposed and substantially V-shaped sweep with the bent-under bottom edge of said hood underlying said sweep.

THOMAS CURTIS GLASS.

REFERENCES CITED

The following references are of record in the file of this patent:

UNITED STATES PATENTS

| Number | Name | Date |
|---|---|---|
| 2,305,254 | Hirschkorn | Dec. 15, 1942 |
| 2,466,555 | Paine et al. | Apr. 5, 1949 |